July 20, 1937.　　　V. H. SEVERY　　　2,087,485
TUNING APPARATUS
Filed Jan. 11, 1936　　　8 Sheets-Sheet 1

Inventor
Victor H. Severy
By Lyon & Lyon
Attorneys

July 20, 1937. V. H. SEVERY 2,087,485
TUNING APPARATUS
Filed Jan. 11, 1936 8 Sheets-Sheet 2
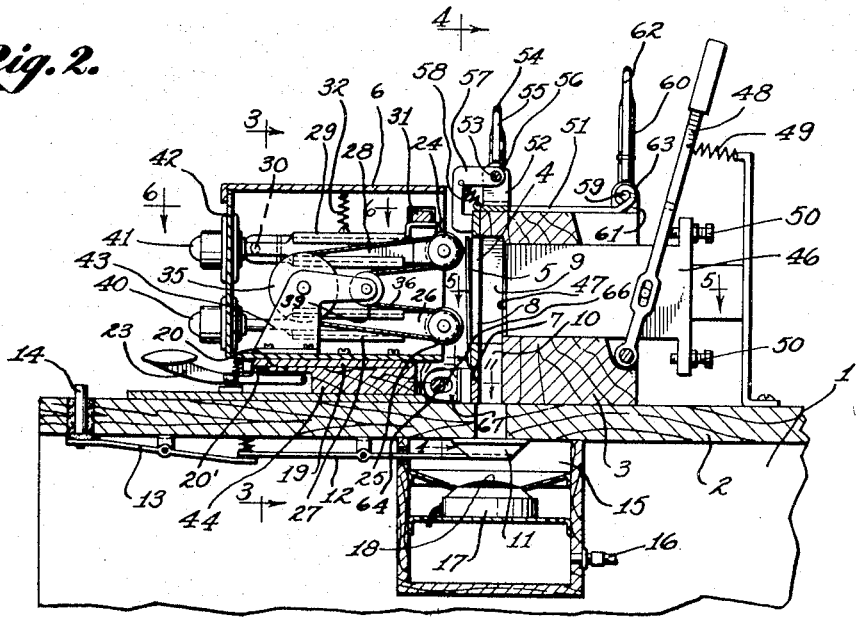
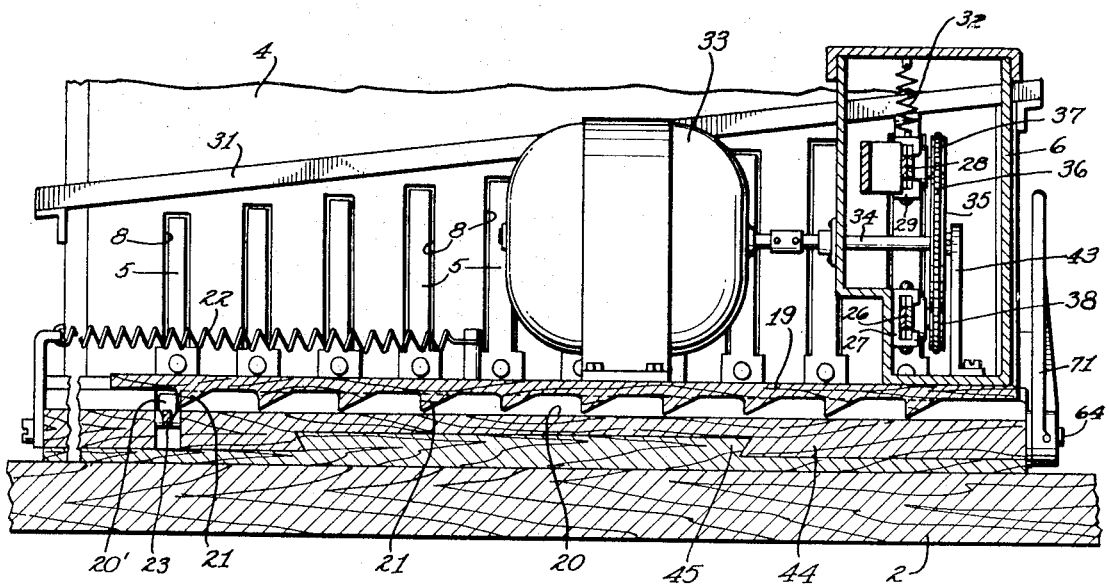
Inventor
Victor H. Severy
By Lyon+Lyon
Attorneys

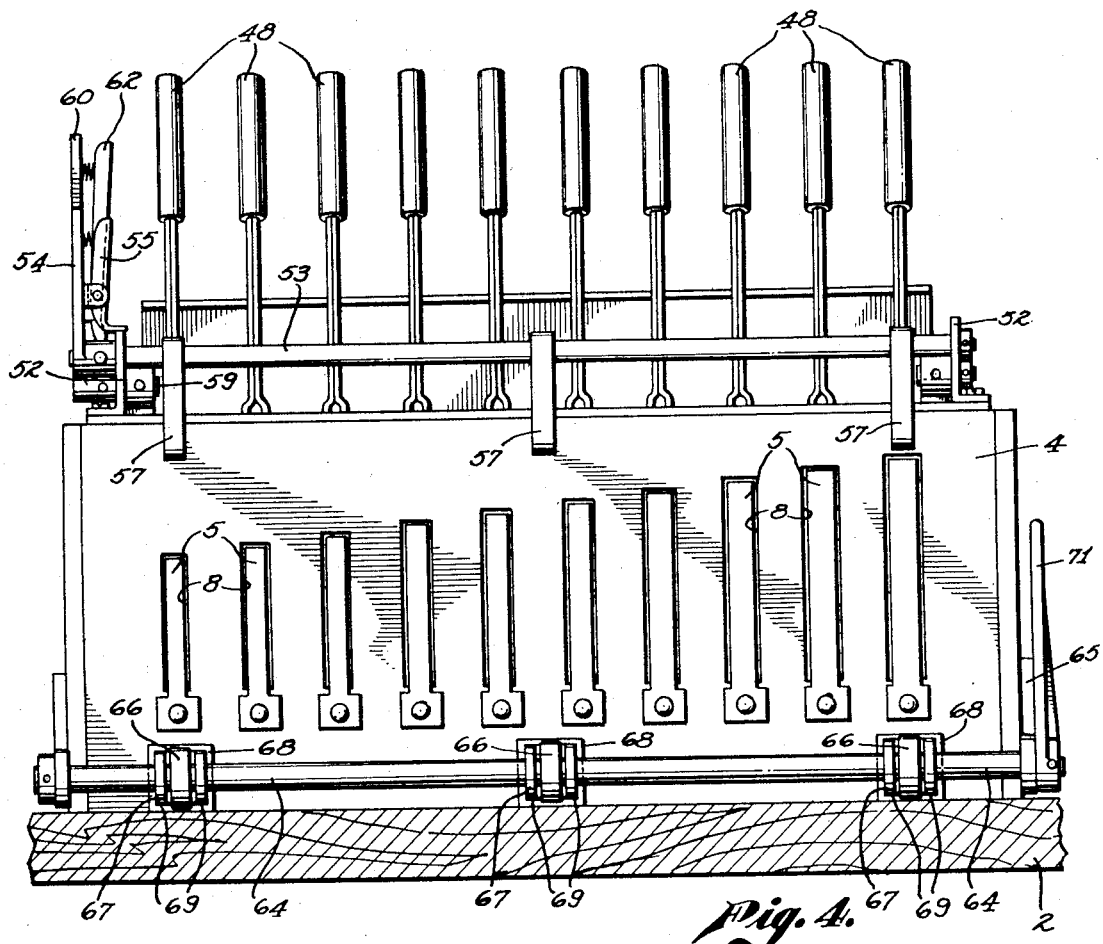
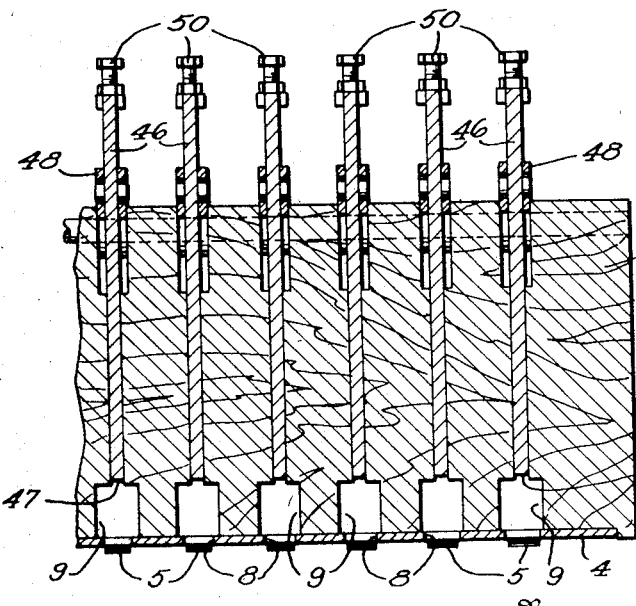

Inventor
Victor H. Severy
By Lyon & Lyon
Attorneys

July 20, 1937.  V. H. SEVERY  2,087,485
TUNING APPARATUS
Filed Jan. 11, 1936  8 Sheets-Sheet 5
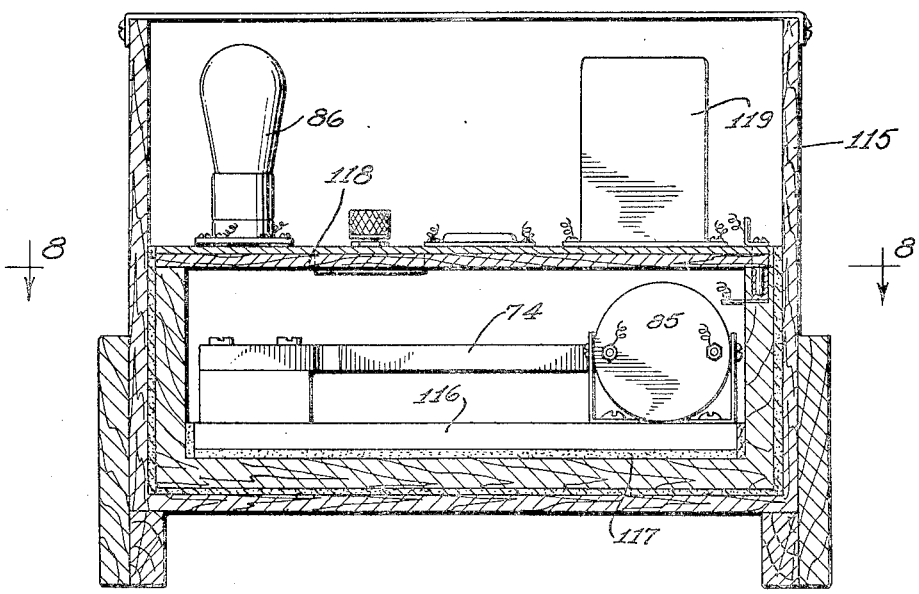
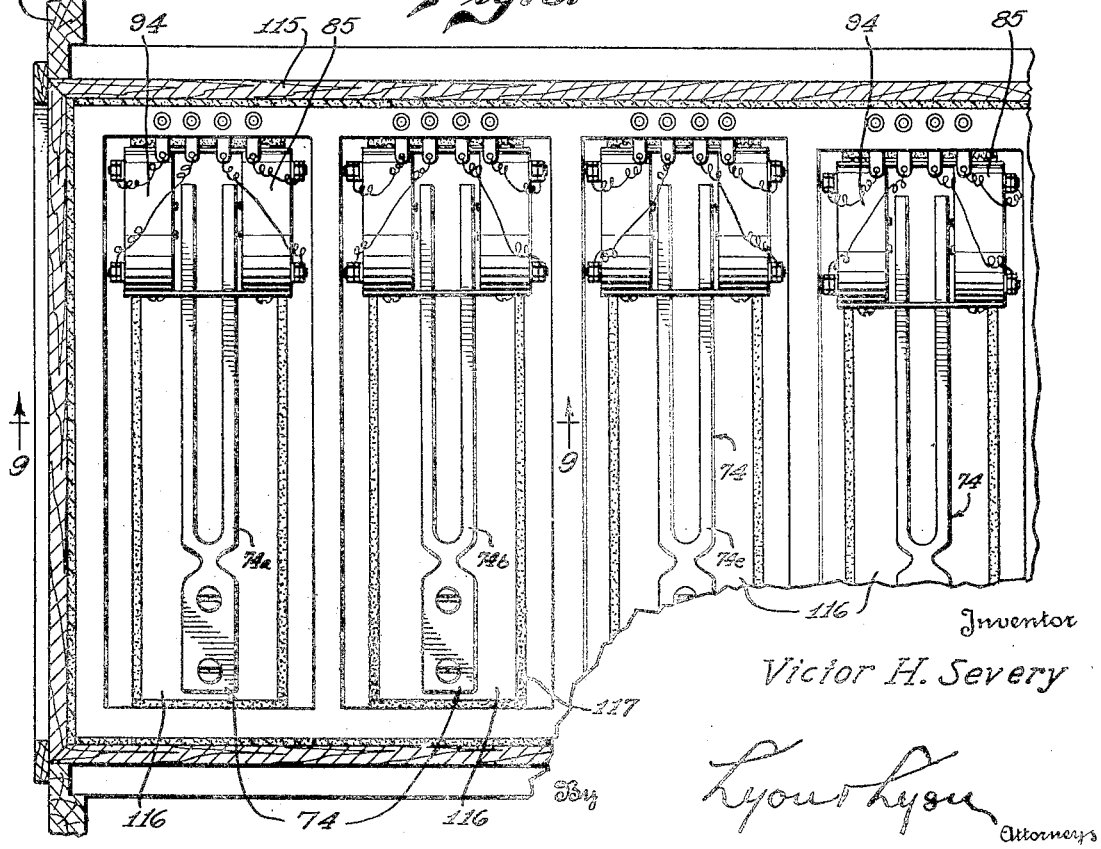
Inventor
Victor H. Severy
By Lyon Lyon
Attorneys July 20, 1937.  V. H. SEVERY  2,087,485
TUNING APPARATUS
Filed Jan. 11, 1936  8 Sheets-Sheet 6
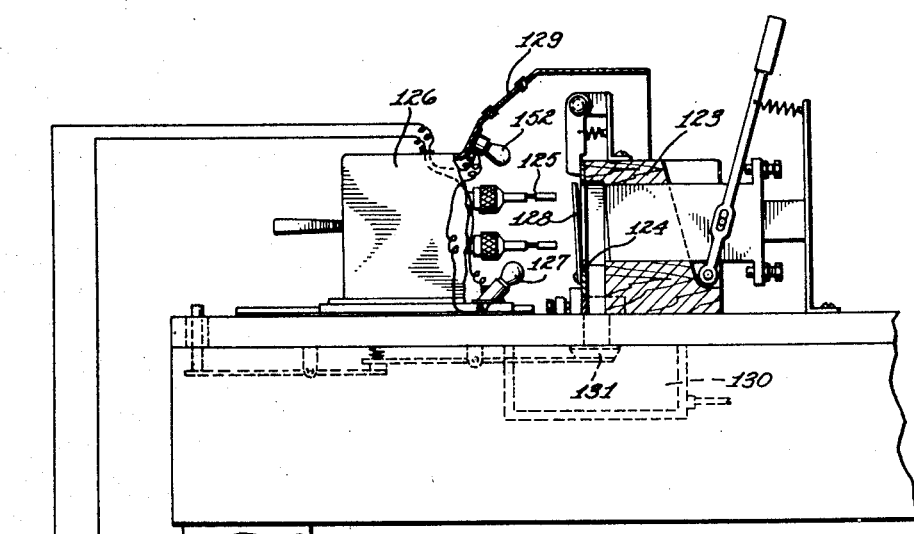
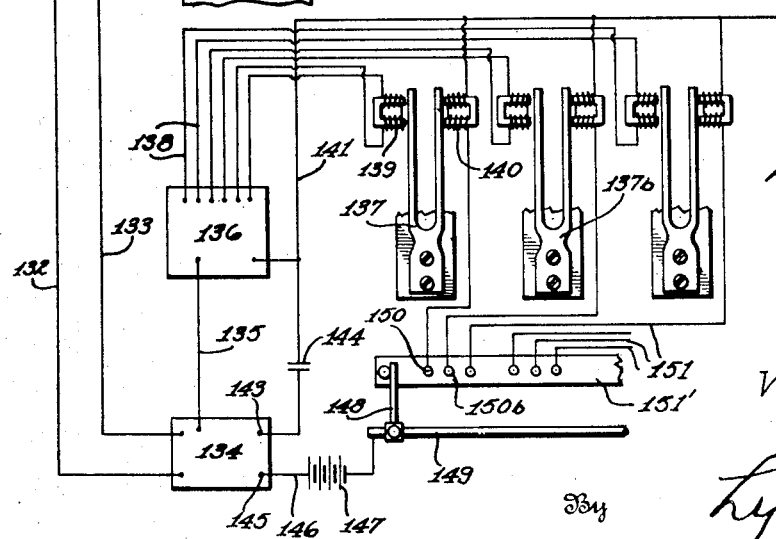
Inventor
Victor H. Severy
By Lyon+Lyon
Attorneys

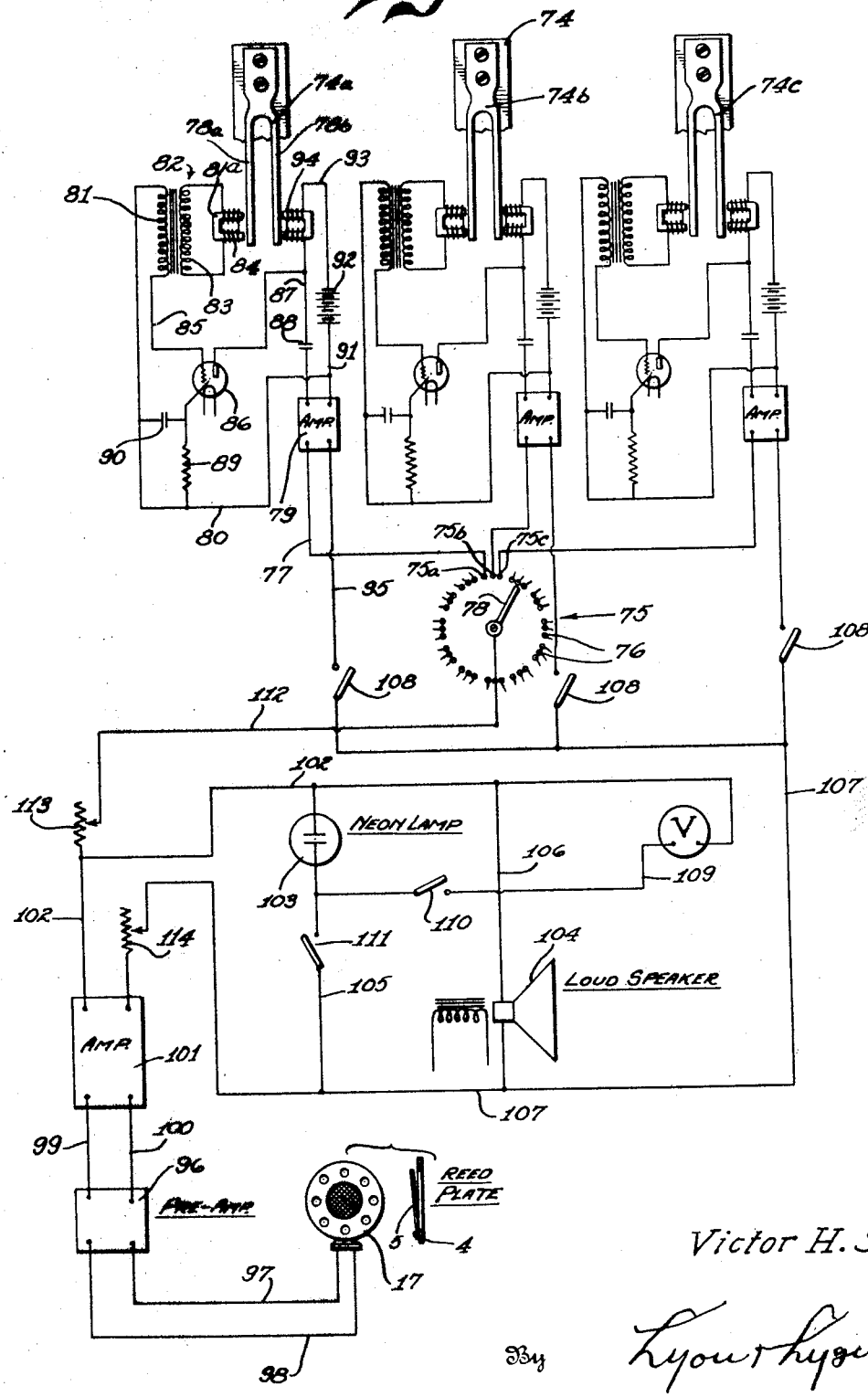

July 20, 1937. V. H. SEVERY 2,087,485
TUNING APPARATUS
Filed Jan. 11, 1936     8 Sheets-Sheet 8
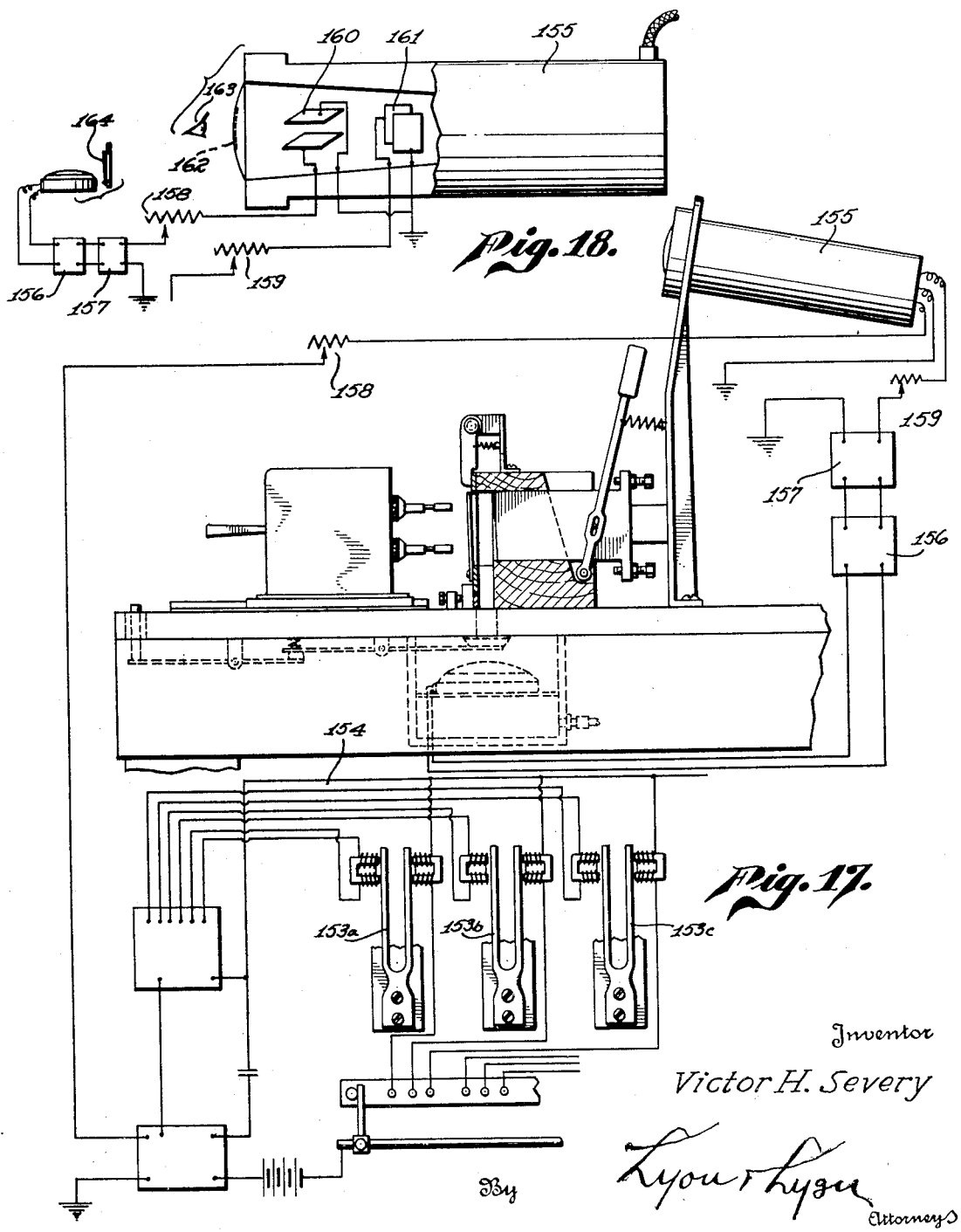

Patented July 20, 1937

2,087,485

UNITED STATES PATENT OFFICE 2,087,485

TUNING APPARATUS

Victor H. Severy, Glendale, Calif.

Application January 11, 1936, Serial No. 58,691

21 Claims. (Cl. 84—454)

This invention relates to tuning apparatus, and while features of the invention may be employed in apparatus for tuning different kinds of musical instruments, the invention is particularly adapted for use in tuning reed instruments, such as harmonicas.

One of the objects of the invention is to provide simple apparatus operating on a "beat" principle, to facilitate tuning of the reeds of a reed instrument, for example, a harmonica; also to provide the same with means for indicating the recurrence of the beats when tuning a reed.

The apparatus preferably includes a carriage, which is movable longitudinally of the reed plate which is supported in a holder when the reeds are being tuned, and one of the objects of the invention is to provide simple means for enabling tools supported in the carriage for removing material from the reed near its fixed end or near its free end, to be brought into alignment successively with the reeds that are to be tuned.

A further object of the invention is to provide simple apparatus involving the use of two tools having simple driving means for actuating the same and capable of being advanced alternately into engagement with the reed being tuned to remove material from the reed near its fixed end, or near its free end to change the frequency of vibration of the reed when the same is out of tune.

A further object of the invention is to provide a simple tuning apparatus for the reeds of a reed instrument, which in use, will indicate visually whether a reed which is being vibrated is vibrating at its proper frequency to produce the note that the reed should produce.

A further object of the invention is to produce improved means for clamping the reed plate in the holder.

Further objects of the invention will appear hereinafter.

The invention consists in the novel parts and combination of parts to be described hereinafter, all of which contribute to produce an efficient tuning apparatus.

A preferred embodiment of the invention is described in the following specification, while the broad scope of the invention is pointed out in the appended claims.

In the drawings:

Fig. 2 is a vertical section through the tuning apparatus illustrated in Fig. 1 and illustrating details of the preferred construction.

Fig. 3 is a vertical section through a portion of the apparatus taken about on the line 3—3 of Fig. 2.

Fig. 4 is a vertical section taken about on the line 4—4 of Fig. 2, but upon an enlarged scale, and particularly illustrating the reed plate held in the reed holder, together with means for clamping the reed plate in position.

Fig. 5 is a section upon an enlarged scale taken about on the line 5—5 of Fig. 2, and particularly illustrating the arrangement of backing means for backing up the reeds of the reed plate when the same are being engaged by the cutting tools to remove a portion of the material, certain parts being broken away.

Fig. 7 is a vertical section through an inner casing of the instrument, and illustrating the means for mounting the tuning forks and other apparatus associated with the same.

Fig. 8 is a horizontal section taken about on the line 8—8 of Fig. 7, and further illustrating the arrangement of the tuning forks.

Fig. 12 is a view showing an embodiment of the apparatus, in which the tuning of the reed may be effected through the use of a flashing neon lamp. This view includes a diagram of the wiring employed in this embodiment.

Fig. 13 is a diagrammatic view illustrating graphically the manner in which the circuit voltage is built up by the recurrence of beats to attain a voltage capable of operating a flashing lamp or light to indicate when the beats are occurring.

Fig. 14 is a diagrammatic view indicating the character of the voltage curves in the circuit developed by the standard fork vibration, and developed by the reed that is under test.

Fig. 15 is a diagrammatic view of a portion of the apparatus cooperating in the tuning of a single reed, and illustrating the use of translating means in the circuit for indicating whether the reed is in tune or not.

Fig. 17 is a diagrammatic view illustrating the general arrangement of my apparatus in which I employ a cathode tube as a translating device for indicating the recurrence of beats in the testing circuit.

Fig. 18 is a diagrammatic view illustrating details of the wiring to the cathode tube.

Fig. 19a is a diagrammatic view illustrating a phase of the image cast on the fluorescent screen of the cathode tube.

Figure 1:
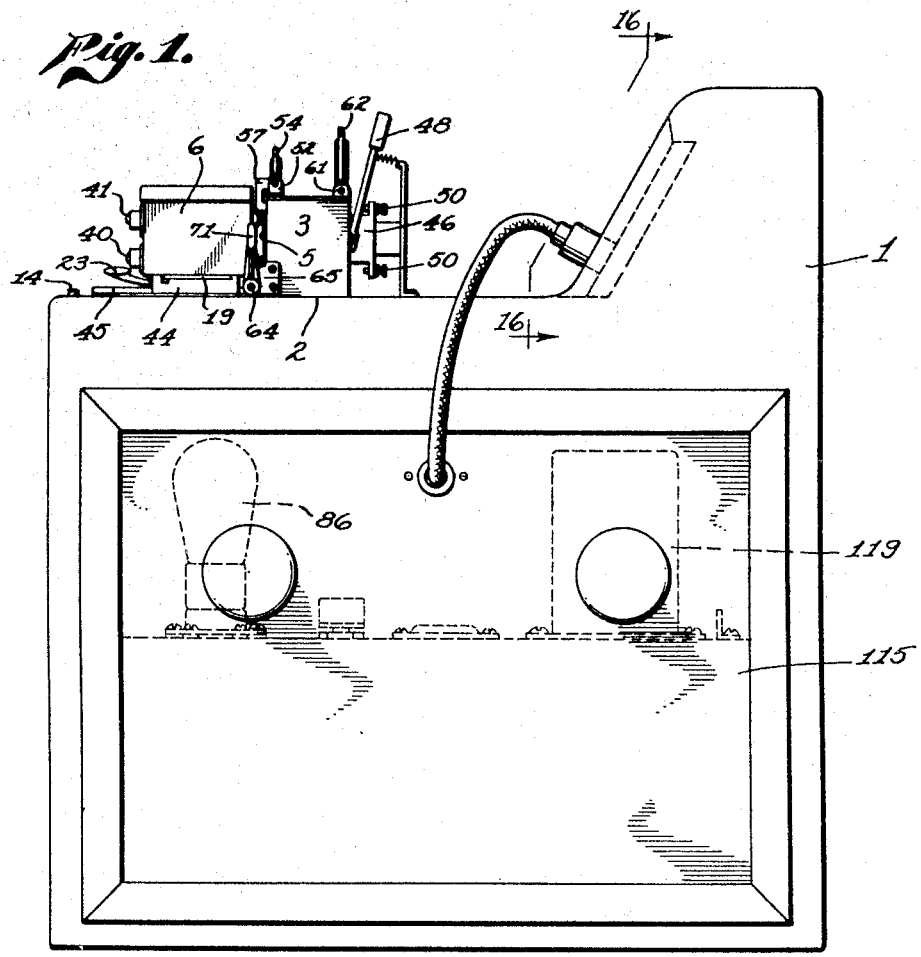
Figure 1 is an end elevation of a tuning apparatus embodying my invention.

Figs. 19b, 19c, 19d, and 19e, indicate different phases of the image cast on the fluorescent screen of the cathode tube.

Before proceeding to a detailed description of the invention, it should be stated that the apparatus operates on the "beat" principle. In one embodiment of the invention, through the medium of the reed or vibrator that is to be tuned, I develop impulses in an electric circuit, and these impulses are amplified into a circuit having considerable voltage. By any suitable means, for example, a standard tuning fork and means cooperating with it, amplified impulses are imposed into the amplified circuit having substantially the same voltage as the impulses imposed into the amplified circuit through the medium of the vibrating reed to be tuned. The impulses imposed into the amplified circuit by the tuning fork have the frequency that the reed should have if it is in tune. If the reed is not in perfect tune, then beats will occur in the amplified circuit, and these beats will recur at less frequency, the nearer the reed is in tune with the tuning fork. Connected with the amplified circuit I provide translating means for indicating the recurrence of these beats. A neon lamp, or a voltmeter, may be employed for this purpose as a translating device, the lamp having a construction which will require a voltage to make it glow or flash, which is substantially the same as the combined voltages of the two imposed sets of impulses when they unite to form a beat.

The apparatus for practical purposes preferably includes three tuning forks as a unit to cooperate with each reed that is to be tuned; one of these forks having exactly the frequency that the reed should have if properly tuned, while one of the other forks has a frequency slightly below that of the reed if properly tuned, and the other fork having a frequency slightly higher. In making a test of a reed to ascertain whether it is in tune, if the beats in the amplified circuit occur at a very low frequency, the reed will be considered as sufficiently in tune, but if the beats recur at such a frequency as to indicate that the reed is not sufficiently in tune, then the impulses being imposed into the amplified circuit from the "correct" or "true" tuning fork are cut out of the circuit, and impulses from one of the other tuning forks are imposed into the circuit. The rate of recurrence of the beats will indicate whether the reed is flat or sharp. Mechanism is provided for moving a small quantity of material from the reed near its fixed end or near its free end, to alter its frequency in the direction indicated by the recurrence of the beats. In this way the reed is brought into tune.

The mechanism for cutting or abrading material from the reed to bring it into tune, is mounted in front of a holder in which the reed plate carrying the reeds is secured, and this mechanism includes two driven tools which are driven through a common flexible drive enabling either one of the tools to be advanced into engagement with the reed without advancing the other, although maintaining the drive to both tools. The tools are preferably mounted on a carriage, which is guided to move longitudinally of the reed plate, and advances along its guide with a step-by-step movement, so that the tools are brought into alignment successively with the different reeds that are to be tuned. As the reeds of reed instruments such as harmonicas, are of graduated length, I have provided means for shifting one of the cutters or abrading tools so that it adapts its position to the length of the reed on which it is to operate.

In another embodiment of the invention, I provide simpler means for effecting the tuning of a reed. In accordance with this embodiment of the invention, I utilize a set of three tuning forks including a "correct" fork, which will impose impulses into a circuit at exactly the frequency that the reed being tuned should have if in tune. This set of three tuning forks includes also, two forks vibrating respectively, at a slightly higher frequency and at a slightly lower frequency than the "correct" fork. In tuning a reed, the reed is vibrated by pneumatic means or other suitable means, and is mounted so as to reflect a beam of light from a flashing lamp, such as a neon lamp, which is first cut into the amplified circuit which is receiving impulses at the frequency of the "correct" fork. The beam from the lamp impinging upon the vibrating reed is reflected to the eye of the tuner, preferably through an observation window. If the reed is in tune and the flashing of the lamp is at the same frequency as the "correct" fork, then the reed as viewed through the observation window, will apparently be standing still. If the reed, when so tested, is apparently moving, then the "correct" fork must be cut out of the circuit, and one of the other two forks of the set cut in alternately; and the action of the reed as viewed through the window, will then indicate whether the reed is flat or sharp.

In another embodiment of the invention I employ a cathode tube having a fluorescent screen at its end, upon which the cathode beam impinges. I provide the interior of this tube with two sets of opposed plates arranged in pairs, and one pair of these plates is capable of being connected up to impulse generators, such as forks, so that these plates will receive amplified impulses and operate to rotate the cathode beam passing between the same. The other pair of plates are preferably disposed in a plane substantially at right angles to the first pair, and they are connected up to a circuit in which amplified impulses are generated through the medium of the reed to be tuned. These plates affect the form of the beam impinging upon the fluorescent screen, and enable this figure to indicate whether the reed is flat or sharp.

Referring more particularly to the parts, and especially to Figs. 1 to 3, 1 indicates a cabinet in which the forks and much of the apparatus is housed. The cabinet is formed with a table top 2 on which a holder 3 is provided for holding the vibrator; and in the present instance, I have illustrated a reed plate 4 of a harmonica carrying a plurality of reeds 5. In front of the holder 3 a casing 6 is provided for housing the tools, and the operating mechanism for the same. These tools are employed to cut off or abrade from the surface of the reed, a small quantity of the material either near the fixed end of the reed, or near the free end.

Referring more particularly to Fig. 2, the reed plate is mounted on a seat 7 on the front of the holder, and the reeds 5 extend upwardly toward their free ends. Each reed vibrates in a reed slot 8 in the reed plate. Back of each reed slot 8 a chamber 9 is formed, which communicates through a port 10 with a valve 11, which is controlled by two levers 12 and 13 so that this valve can be opened at will by depressing a plunger 14 near the forward edge of the table. The valves 11 are located in a suction box or vacuum box 15 to which a hose 16 connects, said hose leading to an air pump, which maintains a partial vacuum in the suction box. In the suction box 15 a pick-up device sensitive to the vibrations of air occasioned by the vibrating reed, is mounted. In the present instance this pick-up device is in the form of a microphone 17. When the valve 11 is open, air is drawn in through the reed slot 8, and the reed is vibrated and produces its note. The vibration of the reed imparts vibrations at the same frequency to the air passing down through the valve into the suction box, and sets up vibrations in the diaphragm 18 of the microphone at the same frequency as the reed. The microphone 17 is connected up into a circuit that will be described hereinafter, and which is provided with means for imposing into an amplified circuit the impulses at the same frequency as the vibration of the reed. If the test of the reed indicates that it is in tune, the tool mechanism is moved on to the next reed. If it happens that a reed is flat or sharp, then a small amount of material must be removed toward one or the other end of the reed, as will now be described.

The tool mechanism preferably comprises a carriage 19 mounted to slide along a guideway 20, so that the carriage can slide longitudinally of the reed plate 4 (see Fig. 3). After operating upon a reed that has been tuned, the carriage is released by moving a hand-controlled detent 20′ which projects up against one of a series of dogs 21, which constitute a rack on the under side of the carriage (see Fig. 3). The carriage is preferably constrained in one direction by means of a spring, for example, a coil spring 22. Fig. 3 shows the carriage located at its extreme right position; but by depressing the thumb plate of a lever 23 the detent 20′ can be depressed below the tooth or dog 21, which it is engaging, and if it is quickly released it will move back to an elevated position in front of the next dog or tooth 21. In this way the cutting or abrading tools mounted on the carriage will be moved over into alignment with the next reed. On the carriage 19 the casing 6 for the tool mechanism is mounted. Within this casing 6 I provide two tools preferably in the form of rotary grinding discs, including an upper disc 24 and a lower disc 25. These discs 24 and 25 are driven by a flexible drive, which is so constructed that although the drive to the discs is common to both of them, either disc can be advanced to engage the reed at will. For this purpose the lower abrading disc 25 is mounted on a slide 26 that is guided in a horizontal guide 27 (see Fig. 3). The upper disc 24 is mounted in a somewhat similar manner, but on account of the graduated length of the reeds it must move downwardly as the carriage advances along the reed plate so as to keep it in line with a point near the tip of the smaller reeds. For this purpose the grinder or disc 24 is mounted on a slide 28 that slides in a guide 29 that is supported at its rear end on a pivot pin 30. Just above the forward end of the guide 29 an inclined guide bar 31 is provided, against the under side of which the forward end of the guide 29 is held by resilient means, such as a coil spring 32. With this arrangement it will be evident that as the carriage moves along the reed plate, the position of the upper disc 24 will change to maintain the disc at about the level of the upper ends of the reeds.

In order to drive the discs, I prefer to provide a small electric motor 33 mounted on the carriage, and the shaft of this motor is connected by a suitable coupling to a driven shaft 34, said shaft 34 being suitably mounted in the casing 6 and carrying a drive pulley 35 (see Fig. 2). A continuous resilient round belt 36, preferably consisting of a coil spring, passes over the drive pulley 35, and is disposed in two forwardly extending loops that pass around driven pulleys 37 and 38 that are rigid with the shafts of the discs 24 and 25. Between the driven pulleys and near the drive pulley 35 a small guide pulley 39 is provided, which assists in forming the forwardly extending loops in the driving belt.

In order to enable either of the grinding discs 24 or 25 to be advanced at will, the rear end of each of the slides 26 and 28 is provided with a plunger 40, 41, and these plungers are guided through the forward wall 42 of the casing 6. The driving pulley 35 is mounted in a fixed bracket 43 on the carriage, and this bracket also carries a small guide pulley 39.

The carriage 19 is carried on a base 44 (see Fig. 3) provided with a guide tongue 45 that enables the carriage to be moved bodily toward the holder 3.

When either of the tools 24 or 25 is advanced against the reed 5 to abrade some of its material, it is necessary to back up the reed opposite the tool. For this purpose I provide a slide plate or block 46 that slides horizontally through the holder, and having an inclined forward face 47. The forward end of each slide or block 46 may be projected forward into its corresponding chamber 9 back of the reed, so that the inclined face 47 will fit up against the reed. Each slide 46 or block, may be advanced at will by an individual lever 48, which is returned by a return spring 49, and the rear end of each block 46 is provided with an adjustable stop 50 for limiting the forward movement of the block when it moves up into position.

The means for clamping the reed plate 4 on a seat 7 of the holder 3, will now be described. For this purpose I prefer to provide a cover plate 51 (see Fig. 2) that rests on the upper face of the holder 3, and the forward edge of this cover plate carries brackets 52 through which the shaft 53 extends, said shaft having an actuating lever 54, with a latch 55 to cooperate with a notch 56 in the bracket 52 to hold the shaft 53 in a raised position when the reed plate is to be removed. This shaft 53 carries a plurality of rigid clamping arms 57, which are preferably bent as shown in Fig. 2, and a coil spring 58 is provided for pulling these clamping arms down against the reed plate 4 at its upper edge. The rear edge of the cover plate 51 is mounted on a shaft 59 similar to the shaft 53, and this shaft is provided with a lever 60, and mounted to rotate in brackets 61. The lever 60 has a latch 62 to cooperate with a notch 63 in one of the brackets 61. When the lever 60 is rotated toward the right, the cover plate 51 will be swung up into an elevated position so as to clear the way for the introduction of a reed plate from above, down onto the seat 7 at the forward side of the holder.

Figure 10:
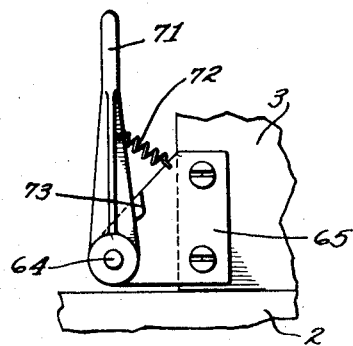
Fig. 10 is a fragmentary view upon an enlarged scale, and illustrates the means for mounting a lever that controls a clamping means to be used with the holder that supports the reed plate when its reeds are being tuned.
Figure 11:
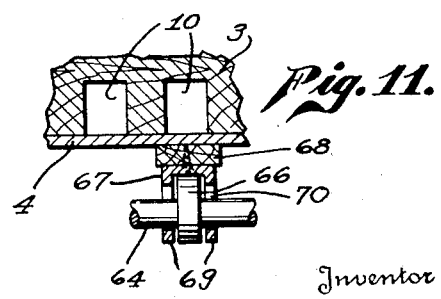
Fig. 11 is a horizontal section taken about on the line 11—11 of Fig. 2 upon an enlarged scale, and further illustrating details of the clamping means for clamping the lower edge of the reed plate, certain parts being broken away.

For holding the lower edge of the reed plate 4 against the seat 7, I prefer to provide a shaft 64 rotatably mounted in brackets 65 attached to the ends of the holder 3 (see Fig. 10) and at a plurality of points along its length, this shaft is provided with eccentrics or cams 66, said cams being spaced apart and each cam being mounted in a bracket 67 attached to a pad 68 (see Fig. 11) and operating so that when the shaft is rotated, each eccentric will press its pad against the forward face of the reed plate. Each bracket 67 has means for holding it on the shaft, and for this purpose each bracket is preferably provided with two wing plates 69 with a large slot or opening 70 formed in them, providing clearance for the shaft when it rotates, and permitting the bracket 67 to move to and fro in applying the pad 68 to the forward face of the reed plate and withdrawing from the same. This shaft 64 may be rotated at will by a lever 71, which is urged to a position to apply the pads 68 to the reed plates, by a coil spring 72 (see Fig. 10) that normally holds the lever 71 up against a fixed stop 73 on one of the brackets 65.

Figure 16:
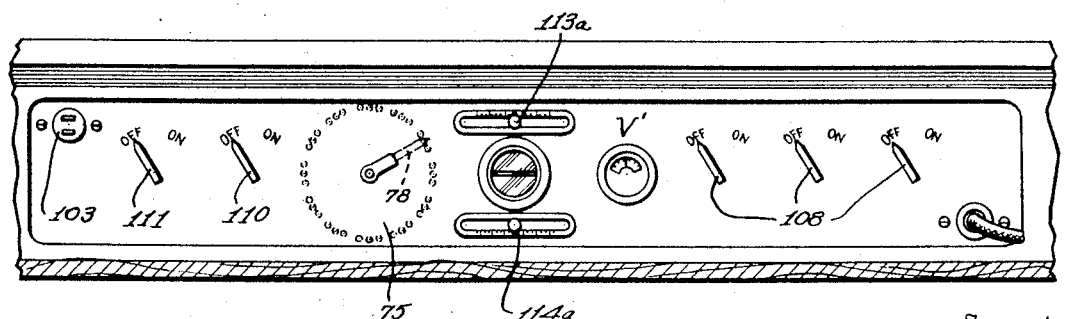
Fig. 16 is a front elevation of the switchboard as viewed from the plane of the line 16—16 in Fig. 1.
Figure 6:
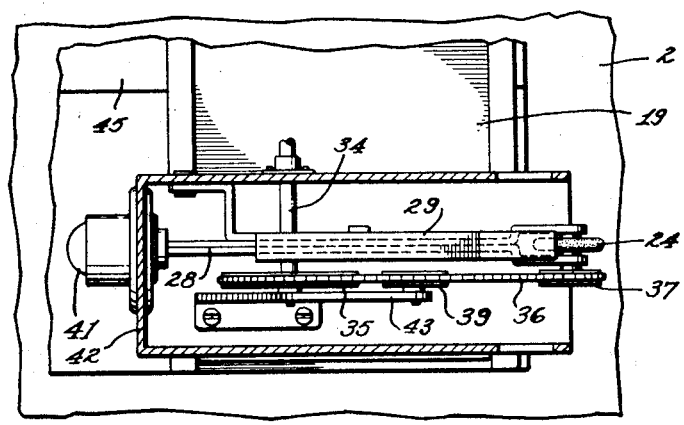
Fig. 6 is a section taken about on the line 6—6 of Fig. 2 upon an enlarged scale, and further illustrating the means for supporting the tools on the carriage, certain parts being broken away.
Figure 9:
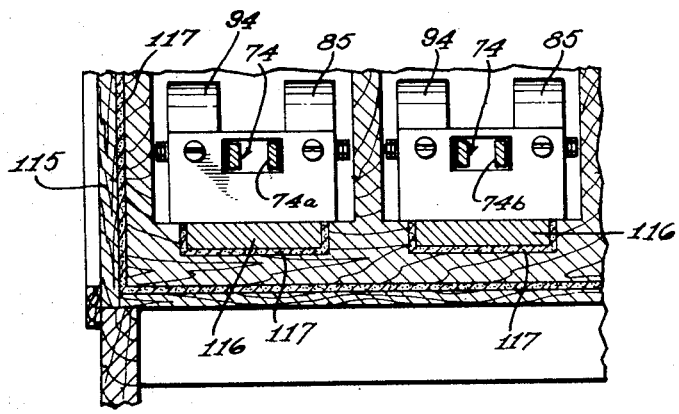
Fig. 9 is a section taken on the line 9—9 of Fig. 8, and further illustrating the means for mounting the forks to insure perfect insulation of the forks from each other to prevent interference.

The preferred arrangement of my apparatus and wiring for the same is indicated in Fig. 15. This diagram illustrates a unit for tuning a single reed involving the use of three forks indicated generally by the numeral 74, and including an intermediate fork 74b, which I call the "correct" fork, and two other forks 74a and 74c. The "correct" fork 74b should vibrate at a frequency which is the same as that of the reed being tuned if the reed is in tune. In other words, it has the frequency that the reed is to be tuned to. The fork 74a has a frequency slightly below that of the fork 74b, and the fork 74c has a frequency slightly higher than the fork 74b. These forks and the apparatus that corresponds to each fork, are wired in parallel to a selector switch 75 indicated diagrammatically in Fig. 15, and also as shown in Fig. 16. The contact points of this switch are indicated generally by the numeral 76, and are disposed in sets of three, each set corresponding to three forks such as the forks 74, each fork apparatus being wired to its corresponding contact 75a, 75b, or 75c, through the corresponding wire 77. As the wiring and apparatus is duplicated for each fork, it will be sufficient to describe the apparatus and wiring associated with one fork, for example, the fork 74a. The apparatus associated with each fork is such that when the movable contact member 78 of the switch 75 is in engagement with a contact such as the contact 75a corresponding to a certain fork, the fork will immediately commence to vibrate and develop impulses in its local circuit at the frequency of the fork. In the apparatus as illustrated in Fig. 15, the tine 78a of the fork 74a initiates the vibrating movement of the fork when the contact 75a and its corresponding wire 77 is connected up into the circuit by the movable switch member 78. When the circuit is closed at this point, impulses are passed into an amplifier 79 from a main circuit system to be described hereinafter, impulses from which are developed at the frequency of the reed that is to be tuned. The other side of the amplifier 79 is connected with the primary 81 of a transformer 82, the secondary coil 83 of which is connected with coils 84 on a permanent bipolar magnet 85, the poles of which are adjacent to the outer face of the fork 78a. From the other end of the primary coil 81 a conductor or wire 81a leads through a triode tube 86 to a conductor or wire 87 connected through a condenser 88 to the other terminal on this side of the amplifier. In order to place bias on the plate of the triode tube 86, a resistance 89 and a condenser 90 are connected into the wire 80 and the tube, as indicated. The same terminal of the amplifier that is connected with the wire 80, connects with a wire or conductor 91 leading through a battery 92 and to a conductor or wire 93 beyond the battery that is connected to a coil 94 of a bipolar magnet, the poles of which are near the face of the tine 78b lying opposite a tine 78a. The other side of the coils 94 are connected to the wire 87 leading back to the amplifier 79. It will be evident that this apparatus has a regenerative action as regards the tuning fork, so that the resiliency of the fork and a recurrence of the impulses in the fork circuit will maintain the fork in continuous vibration as long as the contact 75a is connected into circuit through wire 95 that is connected up with the common wiring system associated with the vibrating reed. Hence, whenever one of the forks 74a, 74b, or 74c is connected up into the circuit, impulses will be developed in the circuit at the frequency of that particular fork. These impulse frequencies are imposed into the main circuit system simultaneously with impulses imposed into that system through the agency of the vibrating reed plate, thereby generating beats. The preferred common wiring arrangement associated with the reed will now be described. This apparatus involves the use of a preamplifier 96, one side of which is connected by circuit wires 97 and 98 with the microphone 17. The other side of the preamplifier 96 is connected by wires 99 and 100 to an amplifier 101. One of the terminals of the other side of the amplifier 101 is connected to a wire 102 connected up to a flashing neon lamp 103, and a loud speaker 104 if desired, the said lamp and loud speaker being connected in parallel on circuit wires 105 and 106 leading over to a return wire 107, which wire 107 is connected in parallel to all the wires 95 of the local fork circuits through suitable switches 108. If desired, a voltmeter V may be connected into a conductor 109 between the wire 102 and the wire 105, and provided with a switch 110 for cutting the voltmeter in or out of circuit. The neon lamp wire 105 is also provided with a switch 111.

A conductor 112 also connects with the wire 102 through a variable modulator resistance 113, and this wire 112 leads to the pivot of the movable contact 78 of the selector switch 75. A similar variable modulator resistance 114 is provided in connection with the conductor 107, and leading off from the amplifier 101.

In Fig. 16, I illustrate the face of the switchboard on which is indicated the selector switch 75 and the three switches 108 for cutting in the branches of the circuit leading through the three forks. In this view handles 113a and 114a are illustrated running in slots in the face of the board, for controlling the two modulator resistances 113 and 114.

The board also carries a dial V' for the voltmeter, and indicates the voltmeter switch 110 and the switch 111 for the neon lamp 103 that is indicated at the left end of the board.

Within the cabinet 1 at a suitable point, boxes such as the box 115 (see Fig. 7) are provided; and in these boxes the tuning forks 74 are mounted. These forks are preferably mounted on individual bases 116, and these bases are mounted on insulation 117 below them and on their ends. The bases 116 also support the coils 84 and 94 for the electromagnets. The forks are preferably mounted in the lower portion of the box, and an inner cover 118 is provided for the box, which may carry the triode tube 86 and the casing 119 for carrying the amplifiers and preamplifiers of the system.

By reason of the fact that each fork is individually insulated below and on all sides at its base, there is no possibility of the vibrations from one fork being imparted through the fork supports to adjacent forks.

In the operation of the testing apparatus described, it should be understood that impulses are imposed into the circuit at the frequency of the reed being tuned, said impulses being amplified in the indicating circuit, so that the current flowing through the neon lamp would have a substantial voltage, for example fifty volts. This current of course, will be a wave current, and in Fig. 13, I have illustrated its phases diagrammatically by a full line 120. When the selector switch 75 is closed through the contact 75b to connect up the "correct" test fork 74b, impulses will be imposed into the indicating circuit at substantially the same voltage as those of the impulses that are being imposed into the circuit through the agency of the reed, for example, fifty volts. The character of this impulse current generated through the agency of the fork, is indicated by the dotted wave line 121 in Fig. 13. These currents should be substantially equal, and should be made so by adjusting the modulator resistances 113 and 114. It will be evident that if the reed is not vibrating at the same frequency as the fork 74b, the two sets of impulses in the circuit will generate "beats". When the voltages from the two sets of impulses are alike at the same instant, this will give substantially double the voltage when this beat occurs, as indicated by the dotted wave line 122.

This beat is utilized by means of a translating device, which will be affected by this increased voltage occurring at a beat, but which will not be affected by the normal voltage developed by either of the impulses in the circuit. This translating device preferably takes the form of a neon lamp, such as the lamp 103, said lamp being constructed so that it will not flash for fifty volts, but will flash for one hundred volts. While the impulses from the reed and from the fork 74b are passing simultaneously through the circuits, if the reed is not exactly in tune, beats will occur; and whenever a beat occurs or recurs, the neon lamp will flash. The rapidity of recurrence of these beats is an index of the amount that the reed is out of tune. If the reed is sharp, then the speed of recurrence of these flashes will be increased by "cutting in" to the indicating circuit, the fork 74a, which vibrates at a lower frequency. By doing this and observing the recurrence of the flashes, the tuner can ascertain whether the reed is sharp or flat, and will then tune the reed accordingly.

In Fig. 12, I illustrate an embodiment of my invention in which I utilize the flashing frequency of a lamp of the neon type to enable a reed to be tuned. In this instance I provide a holder 123 in which a reed plate 124 is mounted, and before which grinding tools 125 are mounted and within the casing or housing 126 I provide a flashing lamp 127 of the neon type, in a position to throw a beam of light onto the vibrating reed 128, so that the reflected ray will pass through an observation window 129 in the casing. Through the medium of a suction box 130 and a valve 131, the reed that is to be tuned is vibrated. The lamp 127 is connected up through conductors 132 and 133 to a preamplifier 134, and this preamplifier is connected through a conductor 135 to an amplifier 136 connected up to a plurality of tuning forks 137 through a plurality of conductors 138. In other words, the electromagnets 139 and 140 that cooperate with the tines of these forks, are connected up in parallel between the amplifier 136 and a return wire 141 that is connected with the terminal 143 and amplifier 134, through a condenser 144. The terminal 145 opposite the terminal 143, connects with a conductor 146 carrying a battery 147, the opposite side of which is connected to a movable switch member 148 guided to move along the contact bar 149, so that its tip can be brought at will into engagement with contacts 150 that are connected by wires 151 with the conductor 141. These contacts 150 are preferably arranged in sets of three like the contacts of the selector switch 75, so that contacts 150 which are mounted on an insulating bar 151', cooperate with the movable contact 148 to constitute a selective switch.

In using this apparatus for tuning, suppose for example, the reed 128 should vibrate at the same frequency as the "correct" fork 137b. In that case, the movable contact 148 would be placed on the contact 150b, as a result of which the lamp 127 will flash at the same frequency as the frequency of the fork 137b. If this frequency is the same as that of the reed 128, then to the eye of an observer at the window 129, the reed 128 will apparently be standing still. If the reed 128 is not in tune with the fork 137b, then the tuner will move the contact 148 in contact with either of the two contacts of the set of three corresponding to that reed, thereby throwing in either of the outside forks 137 of the set, one of which vibrates at a slightly lower frequency than the fork 137b, and the other of which vibrates at a higher frequency. If the reed 128 is more nearly in tune with the fork having a higher frequency, it will appear to have less movement when observed through the window at 129 than when the lamp is being flashed by the fork at the other end of the trio of forks.

If desired, a second neon lamp 152 may be connected up in series with the lamp 127, and located in such a way as to eliminate shadows within the casing 126. With the tuning apparatus illustrated in Fig. 12, it will be evident that the operation of this apparatus also depends upon the "beat" principle, for if the reed is in tune with the middle fork of the set, no visual beats will be apparent to the observer's eye in the window 129. If it is not in tune with the middle fork 137b, and vibrating at the same frequency as the flashing lamp 127, then visual beats will occur at the point of reflection of the beam from the lamp 127.

I shall now briefly describe the general mode of operation of the embodiment of the apparatus illustrated in Fig. 15. The vibration of the reed 5, which is caused by opening the pneumatic valve 11, imparts impulses at the rate of vibration of the reed to the microphone 17, and the microphone current passes through the preamplifier 96 and the amplifier 101, and the amplified impulses occur in the conductor 112 that leads to the movable contact 78 of the selector switch 75. This contact 78 should then be placed on the contact 75b that corresponds to the "correct" tuning fork 74b with which the reed should be in tune. The vibration of this fork will impose amplified impulses into the circuit at the same frequency as the fork 74b. If this frequency is the same as that of the reed, the neon lamp 103 will not flash. However, if the reed is not in tune with the fork 74b, beats will occur as indicated in Fig. 13, and when these beats occur the voltage through the neon lamp will be approximately one hundred volts, which is double that of the voltages being developed through the agency of the reed and through the agency of the fork 74b. In other words, whenever a beat occurs, the voltage will be high enough to flash the neon lamp. If, in tuning, the reed, beats occur at a sufficient frequency to necessitate tuning the reed, then the tuner will move the movable contact 78 of the selector switch 75 to engage the contact 75a, or the contact 75c alternately. As the contact 75a is connected up with the fork 74a that vibrates at a slower frequency than the fork 74b, it follows that if this fork 74a is connected up into the circuit, the beats will recur at a slower rate if the reed is flat. On the other hand, if the fork 74c is connected into the circuit and the reed is flat, the beats in the circuit will recur at a more rapid rate. In other words, the neon lamp 103 will flash faster.

The "beats" can also be observed by the ear applied to the loud speaker 104, and they will also be indicated more or less in the voltmeter V.

When it is ascertained whether the reed is fast or slow, then material is removed from the face of the reed 5 through the agency of one of the tools 24 and 25 illustrated in Fig. 2.

In tuning the reeds, the reed plate is set up so that the longest reed is located at the right, as viewed in Fig. 3. After tuning this reed, the tuner depresses the lever 23, which releases detent 20' (see Fig. 3) from the dog 21, permitting the slide 19 to move toward the left through the space between the dogs 21. This will align the tools 24 and 25 with the next reed which is to be tuned. As the carriage proceeds in this way longitudinally of the reed plate, the guide 29 that carries the uppermost tool 24, which engages with the inclined guide bar 31, depresses the guide 29 by rotating it about its pivot 30 (see Fig. 2). In this way, the tool 24 is caused to move along an inclined line to keep it substantially aligned with the tips of the reeds, which shorten toward the opposite end of the reed plate.

When either of the tools is operating on the reed 5 to remove material, the reed is backed up by the slide block 46.

It will be evident that this apparatus can be employed to test any note produced by any instrument, but can also be employed to test a vocal note. In this case, the singer would sing the note into the microphone 17. This note would affect the microphone so as to impose impulses into the circuit at the same frequency as the note, and the different forks of the set corresponding to this note, would be cut in alternately into the circuit, to determine the rate of recurrence of beats in the neon lamp.

In Fig. 17, I illustrate the employment of a cathode tube with the electrical apparatus of Fig. 12, as a visual translating device. In this case the test impulse generators such as the tuning forks 153a, 153b, and 153c, are connected by a wiring system 154 the same as shown in Fig. 12, to a cathode tube 155 through a preamplifier 156 and an amplifier 157, said wiring system including modulators 158 and 159 connected up respectively to pairs of terminal plates 160 and 161 (see Fig. 18). The plates of one pair are in a plane substantially at right angles to the plane of the other pair. The cathode tube has a fluorescent screen 162 against which the cathode beam impinges. The plates 161 are preferably substantially vertical. As the cathode ray passes through the tube, if only the test impulses are passing in the circuit, then the eye 163 of the tuner will see a fluorescent figure on the screen 162 having at least some of the phases illustrated in Figs. 19a, 19b, 19c, 19d, and 19e by the three cathode tubes 155a, 155b, 155c, 155d, and 155e, but with the figure maintaining fixed axes for itself. But when impulses are developed in the test circuit through the agency of a reed 164 to be tuned, the axis of the figure on the fluorescent screen will appear to rotate due to the rotating effect of the plates 160 on the cathode ray; and this axis-rotation will take place regardless of whether the two sets of impulses in the test circuit are in phase or not. The speed of rotation of this axis indicates the speed or rate of recurrence of the beats. Hence by alternately cutting the different forks 153a, 153b, and 153c, into the circuit, the tuner can ascertain whether the reed being tuned is fast or slow.

It is understood that the embodiment of the invention described herein is only one of the many embodiments this invention may take, and I do not wish to be limited in the practice of the invention, nor in the claims, to the particular embodiment set forth.

What I claim is:

1. In tuning apparatus for an instrument having vibrators, the combination of an electric circuit, pneumatic means for vibrating the vibrator at its natural rate, means energized by the vibrating vibrator for imparting impulses to the electric current flowing in the circuit at the frequency of the vibrator that is to be tuned, means for imparting impulses to the circuit at a constant known frequency approximately the same as the first-named frequency to produce beats in the circuit, and a translating device connected to the circuit for indicating the rate of recurrence of the beats.

2. In tuning apparatus for an instrument having vibrators, the combination of an electric circuit, means for vibrating the vibrator at its natural rate, means energized by the vibrating vibrator for imparting impulses to the electric current flowing in the circuit at the frequency of the vibrator that is to be tuned, said circuit including a branch with means therein for imparting impulses into the circuit at a constant known frequency, and other branches with means in each of the same for imparting impulses to the circuit respectively at constant known frequencies respectively, having a higher and lower rate than the first-named known frequencies, a switch for enabling any one of said branches to be brought into the circuit, thereby causing beats in the circuit, and a translating device in the circuit for indicating the rate of recurrence of the beats.

3. In tuning apparatus for tuning the vibrators of a musical instrument, the combination of a circuit with means for imparting impulses to the circuit at the frequency of the vibrator that is to be tuned, a switch having a main contact corresponding to each vibrator to be tuned, a branch for the circuit leading from said main contact, with means in that branch for imparting impulses to the circuit at a constant known frequency approximately the same as the frequency of the vibrator being tuned, said switch having a pair of auxiliary contacts, one of said last-named auxiliary contacts having a branch corresponding to the same with means in that branch for imparting impulses to the circuit at a slightly higher constant frequency than that of the first-named branch, the other of said contacts having a branch connected therewith with means in that branch for imparting impulses to the circuit at a constant frequency slightly lower than that of the first-named branch, said switch enabling the different branches to be brought individually into circuit to cause beats in the circuit, and means in the circuit for indicating recurrence of the said beats.

4. In tuning apparatus for an instrument having vibrators, the combination of an electric circuit with means for imparting impulses to the electric current flowing in the circuit at the frequency of the vibrator that is to be tuned, means for imparting impulses to the circuit at a constant known frequency approximately the same as the first-named frequency to produce beats in the circuit, and a neon light in the circuit operating to light by the voltage of the beats but remaining dark under the voltage in the circuit below that occasioned by the beats.

5. In tuning apparatus for tuning a harmonica having a reed plate with reeds attached to the same, the combination of a holder for the reed plate, a carriage with means for guiding the carriage to move longitudinally of the reed plate, two tools carried by the carriage with means for guiding the same to enable either of the tools to be advanced to engage a reed to remove a portion of the material thereof, and means for effecting the advance of the carriage with a step-by-step movement longitudinally of the reed plate so as to align the tools successively with the different reeds.

6. In tuning apparatus for tuning a harmonica having a reed plate with reeds attached to the same, the combination of a holder for the reed plate, a carriage with means for guiding the carriage to move longitudinally of the reed plate, two tools carried by the carriage with means for guiding the same to enable either of the tools to be advanced to engage a reed to remove a portion of the material thereof, means for effecting the advance of the carriage with a step-by-step movement longitudinally of the reed plate to align the tools successively with the different reeds, and a hand-controlled slide capable of moving in back of the reed that is engaged by either of the tools to back up the same while in engagement with the tool.

7. In tuning apparatus for tuning a harmonica having a reed plate with reeds attached to the same, the combination of a holder for the reed plate, a carriage with means for guiding the carriage to move longitudinally of the reed plate, two tools carried by the carriage with means for guiding the same to enable either of the tools to be advanced to engage a reed to remove a portion of the material thereof, a common flexible driving means for driving both of the tools, enabling either of the tools to be advanced to engage the reed without advancing the other tool, and means for effecting the advance of the carriage with a step-by-step movement longitudinally of the reed plate to align the tools successively with the different reeds.

8. In tuning apparatus for tuning a harmonica having a reed plate with reeds attached to the same, the combination of a holder for the reed plate, a carriage with means for guiding the carriage to move longitudinally of the reed plate, two tools carried by the carriage with means for guiding the same to enable either of the tools to be advanced to engage a reed to remove a portion of the material thereof, a pulley corresponding to each tool for rotating the same and supported on the carriage, a driving pulley supported on the carriage, a resilient belt passing over said pulleys for driving both tools, said resilient belt enabling either of said tools to be advanced without advancing the other tool to bring the tool that is being used into contact with the reed that is being tuned, and means for effecting the advance of the carriage with a step-by-step movement longitudinally of the reed plate to align the tools successively with the different reeds.

9. In tuning apparatus for tuning a harmonica having a reed plate with reeds attached to the same, the combination of a holder for the reed plate, a pair of rotary tools with means for supporting the same in front of the reed plate, a common flexible driving means for both of said tools with means for guiding said tools to enable either tool to be advanced into engagement with the reed to remove a portion of the material thereof.

10. In tuning apparatus for tuning a harmonica having a reed plate with reeds attached to the same, the combination of a holder for the reed plate, a carriage with means for supporting and guiding the same to move longitudinally of the reed plate, said carriage having a rack thereon, a movable detent controllable at will, for engaging the rack, and a pair of tools mounted on the carriage with means for driving the same, said rack and said detent cooperating to enable the carriage to be held in different positions to enable the tools to be aligned successively with the different reeds.

11. In tuning apparatus for tuning a harmonica having a reed plate with reeds attached to the same, the combination of a holder for the reed plate, a carriage with means for supporting and guiding the same to move longitudinally of the reed plate, said carriage having a rack thereon, a movable detent controllable at will, for engaging the rack, a pair of tools mounted on the carriage with means for driving the same, said rack and said detent cooperating to enable the carriage to be held in different positions to enable the tools to be aligned successively with the different reeds, and means for urging the carriage to move in one direction.

12. In tuning apparatus for an instrument having vibrators, the combination of an electric circuit with means for imparting impulses to the electric current flowing in the circuit at the frequency of the vibrator that is to be tuned, said circuit including a branch with means therein for imparting impulses into the circuit at a constant known frequency, and other branches with means in each of the same for imparting impulses to the circuit respectively at constant known frequencies respectively, having a higher and lower rate than the first-named known frequencies, a switch for enabling any one of said branches to be brought into the circuit, thereby causing beats in the circuit, and a flashing neon lamp in the circuit energized only by the beats passing through the same and mounted in a position to enable the reed being tuned to reflect a light beam from the lamp.

13. In tuning apparatus for tuning a harmonica having a reed plate with reeds attached thereto, the combination of a holder for the reed plate, means for vibrating the reed that is to be tuned, an electric circuit, a flashing lamp in said circuit, means for imposing impulses in the current flowing in the circuit at the same frequency that the reed should have if in tune, said holder operating to hold the reed plate so that the reed being tuned will reflect a beam of light from the flashing lamp.

14. In tuning apparatus for tuning a harmonica having a reed plate with reeds attached thereto, the combination of a holder for the reed plate, means for vibrating the reed that is to be tuned, an electric circuit, a flashing lamp in said circuit, means for imposing impulses in the current flowing in the circuit at the same frequency that the reed should have if in tune, said holder operating to hold the reed plate so that the reed being tuned will reflect a beam of light from the flashing lamp, and a casing having an observation window in the path of the beam after being reflected from the reed being tuned.

15. In tuning apparatus for tuning a harmonica having a reed plate with reeds attached thereto, the combination of a holder for the reed plate, means for vibrating the reed that is to be tuned, an electric circuit, a flashing lamp in said circuit, means for imposing impulses in the current flowing in the circuit at the same frequency that the reed should have if in tune, alternate means for imposing impulses in the current flowing in the circuit at a higher frequency than the reed should have if in tune, and alternate means for imposing impulses in the current flowing in the circuit at a lower frequency than the reed should have if in tune, and switch means for imposing the higher or lower frequency impulses into the circuit at will, said holder operating to hold the reed plate so that the reed being tuned will reflect a beam of light from the flashing lamp.

16. In tuning apparatus for tuning a harmonica having a reed plate with reeds attached thereto, the combination of a holder for the reed plate, means for vibrating the reed that is to be tuned, a pair of tools with means for supporting the same in alignment with the reed to be tuned, one of said tools being located near the fixed end of the reed, and the other tool being located near the free end of the reed, an electric circuit, a flashing neon lamp in said circuit, means for imposing impulses in the current flowing in the circuit at the same frequency that the reed should have if in tune, said holder operating to hold the reed plate so that the reed being tuned will reflect a beam of light from the flashing neon lamp, an observation window in the path of the beam after being reflected from the reed being tuned, and means for advancing either of the tools into contact with the reed to remove material near its fixed end or near its free end.

17. In tuning apparatus for tuning a harmonica having a reed plate with reeds attached thereto, the combination of a holder for the reed plate, means for vibrating the reed that is to be tuned, a casing, a pair of tools supported within the casing in line with the reed and located respectively near the fixed end of the reed and near the free end of the reed, an electric circuit, a lamp mounted in the circuit below the level of the tools, a flashing neon lamp located in the circuit above the level of the tools, means for imposing impulses in the current flowing in the circuit at the same frequency that the reed should have if in tune, and means for alternately imposing impulses in the current flowing in the circuit at higher frequency and at lower frequency than that of the reed if in tune, and an observation window in the casing, said holder operating to hold the reed plate so that the reed being tuned will reflect beams of light from the flashing lamp.

18. In tuning apparatus for tuning the vibrators of a musical instrument, the combination of a circuit, a pick-up device in the circuit mounted adjacent the vibrator that is to be tuned and operating to impose impulses into the said circuit at the same frequency as that of the vibrator that is to be tuned, a multiple switch in the circuit having a plurality of contacts arranged in sets of three, each set including an intermediate contact and end contacts, a circuit connected with the intermediate contact for imposing impulses into the circuit at the same frequency as the vibrator being tuned would have if in tune, thereby producing beats in the said circuit, means connected with the circuit for indicating the said beats, one of said end contacts of each set of three having means connected therewith for imposing into the circuit impulses at a constant frequency higher than that of the vibrator being tuned, and the other of said end contacts having means connected therewith for imposing impulses into the said circuit at a constant frequency lower than that of the vibrator being tuned, the said indicating means for indicating the beats cooperating with the circuits to indicate whether the vibrator being tuned is sharp or flat.

19. In tuning apparatus for tuning a harmonica having a reed plate with reeds attached to the same, the combination of a holder for the reed plate, a carriage with means for guiding the carriage to move longitudinally of the reed plate, two tools carried by the carriage with means for guiding the same to enable either of the tools to be advanced to engage a reed to remove a portion of the material thereof, means for movably supporting one of the tools on the carriage to enable the same to be moved up or down, and relatively fixed guiding means for moving the last-named means as the carriage advances longitudinally of the reed plate to enable the tool carried by the said last-named means to operate upon a reed plate in which the reeds are of graduated length.

20. In tuning apparatus for tuning a harmonica having a reed plate with reeds attached to the same, a holder for the reed plate having a seat for the reed plate, a shaft extending longitudinally of the seat and longitudinally of the reed plate when mounted on the seat, a plurality of cams on the shaft, and means cooperating with the same so that when the shaft is rotated the reed plate will be clamped at a plurality of points along its length.

21. In tuning apparatus for use by a tuner in tuning the vibrators of a musical instrument, the combination of a circuit with means for imparting impulses to the circuit at the frequency of the vibrator that is to be tuned, a switch having a main contact corresponding to each vibrator to be tuned, a branch for the circuit leading from said main contact, with means in that branch for imparting impulses to the circuit at a constant known frequency approximately the same as the frequency of the vibrator being tuned, said switch having a pair of auxiliary contacts, one of said last-named auxiliary contacts having a branch corresponding to the same with means in that branch for imparting impulses to the circuit at a slightly higher constant frequency than that of the first-named branch, the other of said contacts having a branch connected therewith with means in that branch for imparting impulses to the circuit at a constant frequency slightly lower than that of the first-named branch, said switch enabling the different branches to be brought individually into circuit to cause beats in the circuit, and means in the circuit for indicating to the vision of the tuner the recurrence of the said beats.

VICTOR H. SEVERY.